United States Patent [19]
Robertson et al.

[11] Patent Number: 6,135,726
[45] Date of Patent: Oct. 24, 2000

[54] POWER STEERING POWER PACK MOTOR/PUMP MOUNTING BRACKET

[75] Inventors: James Richard Robertson, Walled Lake; Timothy Matthew Staton, Ypsilanti; William L. Fisher, Dexter, all of Mich.

[73] Assignee: Ford Motor Company, Dearborn, Mich.

[21] Appl. No.: 09/404,575

[22] Filed: Sep. 23, 1999

[51] Int. Cl.[7] .................................................. F04B 35/06
[52] U.S. Cl. ............................................ 417/360; 417/363
[58] Field of Search ...................................... 417/360, 363

[56] References Cited

U.S. PATENT DOCUMENTS

| | | | |
|---|---|---|---|
| Re. 31,820 | 1/1985 | Litch, III | 219/93 |
| 2,739,537 | 3/1956 | Sadler et al. | 17/360 |
| 2,885,963 | 5/1959 | Ivanoff | 103/87 |
| 2,900,112 | 8/1959 | Edwards | 222/180 |
| 4,161,667 | 7/1979 | Buckman et al. | 310/51 |
| 4,544,334 | 10/1985 | Ellis | 417/360 |
| 4,600,367 | 7/1986 | Terauchi et al. | 417/360 |
| 4,702,678 | 10/1987 | Phuc | 417/360 |
| 4,810,174 | 3/1989 | Stuckey et al. | 417/423.14 |
| 4,856,608 | 8/1989 | Adams | 180/148 |
| 4,890,683 | 1/1990 | Matsuda | 180/79.1 |
| 5,007,806 | 4/1991 | Bellis et al. | 417/360 |
| 5,030,067 | 7/1991 | Ushiota et al. | 417/313 |
| 5,470,207 | 11/1995 | Shockey et al. | 417/313 |
| 5,492,456 | 2/1996 | Knight et al. | 417/360 |
| 5,520,519 | 5/1996 | Birkeland | 417/63 |
| 5,567,133 | 10/1996 | Kobaybashi et al. | 417/423.7 |
| 5,810,568 | 9/1998 | Whitefield | 417/423.8 |

*Primary Examiner*—Charles G. Freay
*Assistant Examiner*—Robert Z. Evora
*Attorney, Agent, or Firm*—Gregory P. Brown, Esq.

[57] ABSTRACT

An electro-hydraulic gear pump power pack (10), including a hydraulic pump disposed in a pump reservoir (12) and an electric motor disposed in a motor housing (14), are secured together to form a single assembly. The pump reservoir (12) and the motor housing (14) are secured together by a pair of mounting brackets (18) that also serve to attach the power pack (10) to a vehicle structure (20).

19 Claims, 3 Drawing Sheets

POWER STEERING POWER PACK MOTOR/PUMP MOUNTING BRACKET

TECHNICAL FIELD

The present invention relates generally to apparatus for mounting hydraulic pumps within a vehicle. More particularly, the present invention relates to a mounting bracket for an electro-hydraulic power steering power pack that mounts the power pack within the vehicle and also secures the pump reservoir to the motor housing.

BACKGROUND ART

The use of hydraulic pumps, such as power steering pumps, is well known in the automotive industry. The use of electro-hydraulic power steering systems that have an electric motor coupled to a hydraulic pump have also recently been utilized in the automotive industry. These power steering systems have a power pack, which typically consists of an electric motor and a hydraulic pump. The motor and the pump are typically secured to one another by screws or other conventional securing means that pass through their respective housings. Thereafter, the power pack is mounted within the vehicle by additional brackets, screws, harnesses, or other known attachment mechanisms.

These attachment mechanisms can be cumbersome to use, which increases the assembly time of the power steering system and hence the vehicle. Further, these attachment mechanisms can also increase the weight and cost of the system. Moreover, different attachment mechanisms are sometimes required depending upon where in the vehicle the power pack is to be mounted as well as the orientation of the power pack when secured to the vehicle.

SUMMARY OF THE INVENTION

It is therefore an object of the present invention to provide a mounting bracket for an electro-hydraulic power steering system that secures a reservoir cover of a hydraulic pump to an associated housing for an electric motor and also secures the power steering system within the vehicle.

It is a further object of the present invention to provide a mounting bracket for an electro-hydraulic power steering system that reduces the cost, the weight, and the assembly time of the system.

In accordance with the objects of the present invention an electro-hydraulic power steering power pack is provided. The power pack includes a hydraulic pump, which is housed within a pump reservoir, and an electric motor which is housed in a motor housing. The pump reservoir is secured to the motor housing by a plurality of mounting brackets. Each of the plurality of mounting brackets has at least two mounting apertures. One of the at least two mounting apertures is formed to communicate with an aperture formed in either the pump reservoir or the motor housing to receive a fastener therethrough to secure each bracket thereto. Each bracket has a locking tab that engages the other of the pump reservoir or the motor housing to secure the pump reservoir to the motor housing when the fastener is tightened, thus firmly securing the pump reservoir and motor housing together. The second of the mounting bracket aperture is formed to communicate with an opening in a vehicle structure for receipt of a fastener therethrough to secure the power pack to the vehicle structure.

Other objects and features of the present invention will become apparent when viewed in light of the detailed description of the preferred embodiment when taken in conjunction with the attached drawings and appended claims.

DESCRIPTION OF THE PREFERRED EMBODIMENT

Figure 1:
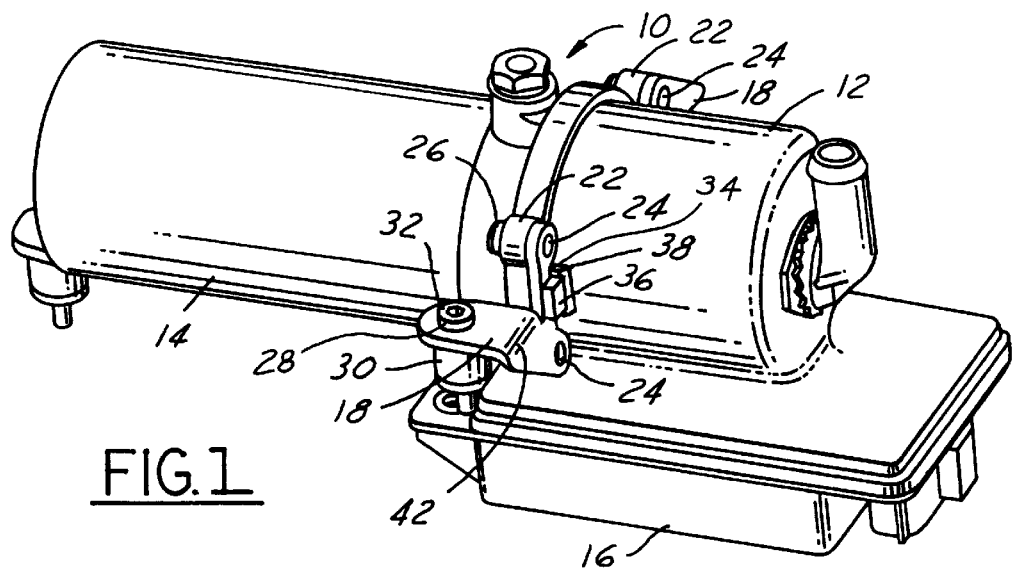
FIG. 1 is a perspective view of an electro-hydraulic power steering power pack in accordance with a preferred embodiment of the present invention.

Referring now to FIG. 1, which is a perspective view of an electro-hydraulic power steering power pack 10 in accordance with the present invention. The power pack 10 includes a hydraulic pump or gear pump disposed within a pump reservoir 12 and an electric motor disposed in a motor housing 14. The electric motor is in rotational communication with the hydraulic pump to convey fluid from the pump reservoir 12 to a load. The power pack 10 is preferably for incorporation into a vehicle power steering system, but may be utilized in a variety of non-automotive applications. The hydraulic pump is preferably a positive displacement pump, such as a gear pump or a vane pump. However any other positive displacement pump may be utilized. The disclosed motor may be any commercially available DC motor. The motor is preferably controlled by a printed circuit board, which is housed in an electrical interconnect housing 16 that is integrally cast with the pump reservoir 12.

Figure 2:
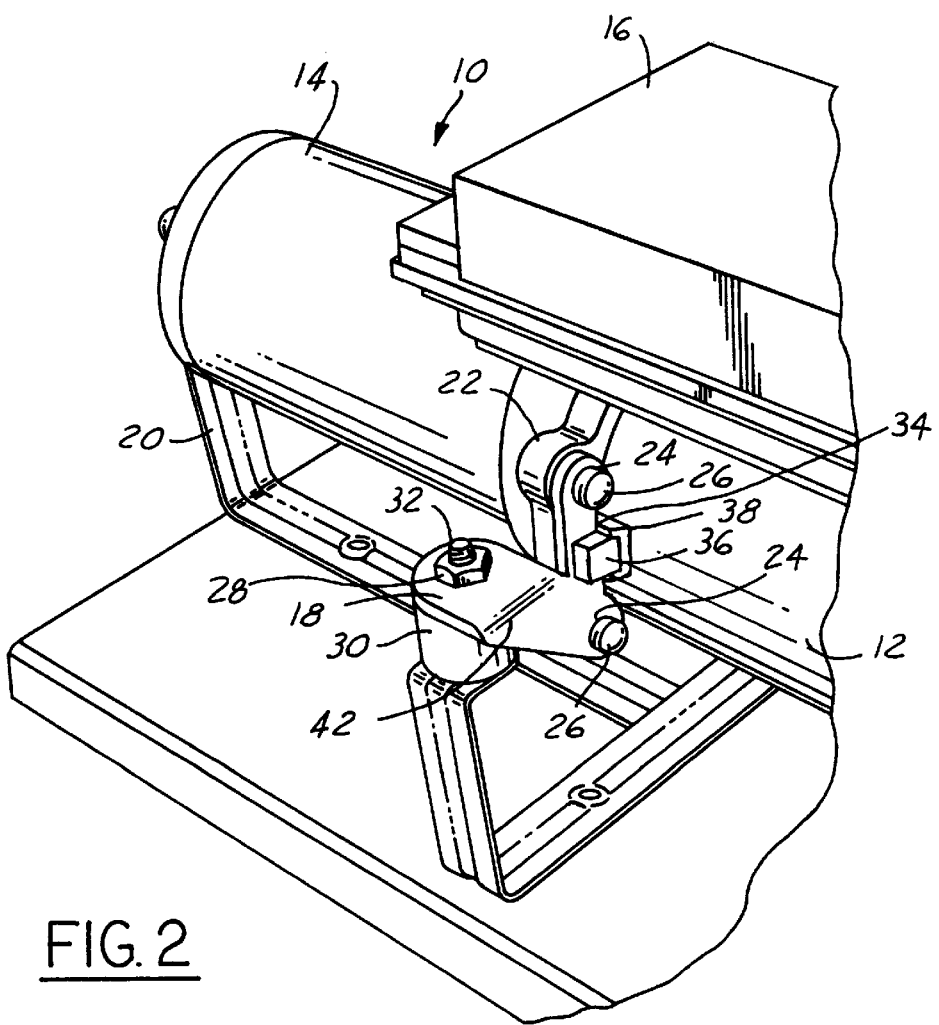
FIG. 2 is a perspective view of an electro-hydraulic power steering power pack attached to a vehicle structure by a mounting bracket in accordance with a preferred embodiment of the present invention.

Referring now to FIGS. 1 and 2, the pump reservoir 12 is secured to the motor housing 14 by a plurality of mounting brackets 18, which are discussed in more detail below. The mounting brackets not only secure the pump reservoir 12 to the motor housing 14, but they also allow for the attachment of the power pack 10 to a structure 20 within a vehicle in which the power packed is mounted, such as a vibration isolation system. In the preferred embodiment, two mounting brackets 18 are preferably utilized to secure the power pack 10 to the vehicle structure 20 with the mounting brackets being uniformly spaced around the power pack 10, i.e., 180° apart. It should be understood that any number of mounting brackets 18 may be utilized and that they may be located at a variety of different locations around the power pack 10. The number of mounting brackets 18 must be sufficient to both secure the pump reservoir 12 to the motor housing 14 while also securing the power pack 10 to the vehicle structure 20.

Figure 3:
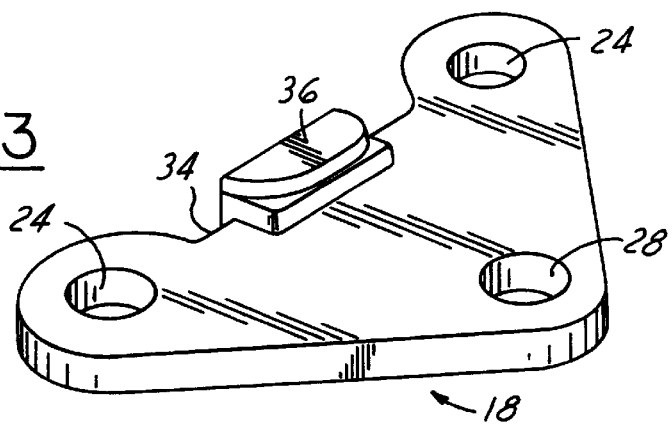
FIG. 3 is perspective view of a mounting bracket in accordance with a preferred embodiment of the present invention.
Figure 6:
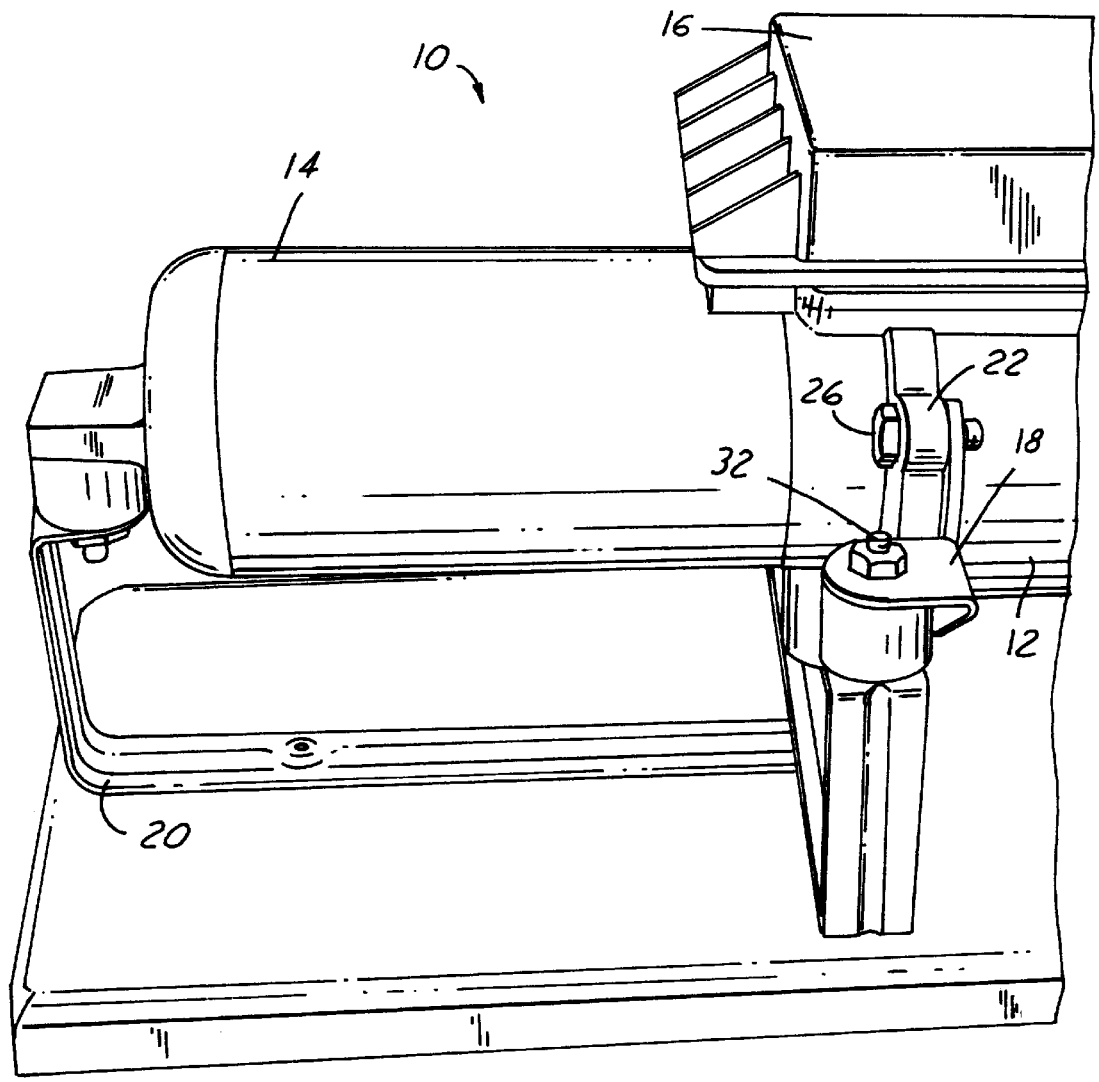

FIGS. 1, 2 and 6 illustrate a preferred embodiment of the mounting bracket 18. While only one mounting bracket 18 is shown in FIGS. 2 and 3, a second mounting bracket (not shown) is preferably located on the opposing side of the power pack 10. The mounting bracket 18 is preferably attached to a plurality of apertures 22 that are integrally formed with and extend outwardly from the motor housing 14. The plurality of apertures 22 may instead be integrally formed with the pump reservoir 12 and may also take on a variety of different configurations.

The mounting bracket 18 includes a pair of inward bracket apertures 24 that are alignable with the plurality of apertures 22 formed in the motor housing 14. Once the plurality of apertures 22 and the inward bracket apertures 24 are aligned, a fastener 26, such as a bolt, screw or any other conventional securing apparatus is preferably inserted through the aligned apertures 22, 24 to secure the motor housing 14 to the mounting bracket 18. While the mounting bracket 18 has two inward bracket apertures 24 that are each aligned with an aperture 22, for receipt of the fastener 26 therethrough, more or less inward bracket apertures 24 may be included.

The preferred mounting bracket 18 also has an outward bracket aperture 28 that is alignable with an aperture 30 formed in the vehicle structure 20. Once the apertures 28 and 30 are aligned, a fastener 32 may be passed through both the outward bracket aperture 28 and the vehicle structure aperture 30 to secure the mounting bracket 18 to the vehicle structure 20, thereby mounting the power pack 10 to the vehicle structure 20. Again, the fastener 32 may be a bolt, screw or any other conventional securing apparatus. Further, while only a single outward bracket aperture 28 is shown, more or less outward bracket apertures may be utilized.

The mounting bracket 18 is preferably configured such that it has an inward surface 34 that extends between the pair of inward bracket apertures 24. The inward surface 34 is preferably generally arcuate in shape so as to match the shape of the outer peripheral surface of the pump reservoir 12. The inward surface 34 preferably includes a locking tab 36 that engages a slot 38 formed in the outer peripheral surface of the pump reservoir 12. Accordingly, when the fasteners 26 are tightened to attach the mounting brackets 18 to the motor housing 14, the reservoir cover 12 is also secured.

As shown in FIGS. 1, 2 and 6, the mounting bracket 18 is formed of a single integral structure. In one embodiment, the outward bracket aperture 28 is located in a plane that lies generally perpendicular to the plane in which the pair of inward bracket apertures 24 lie. The outward bracket aperture 28 is formed in a flange portion 42 that lies generally perpendicular to the main bracket 18 for alignment with the aperture 30. This configuration allows the power pack 10 to be mounted to the vehicle structure 20, such as a vibration isolation system, in a horizontal configuration.

Figure 4:
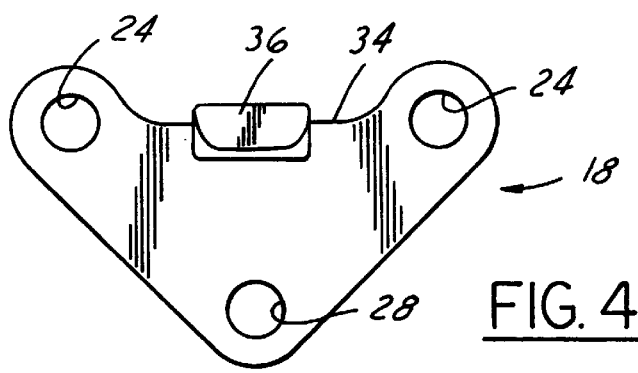
FIG. 4 is front plan view of a mounting bracket in accordance with a preferred embodiment of the present invention.
Figure 5:
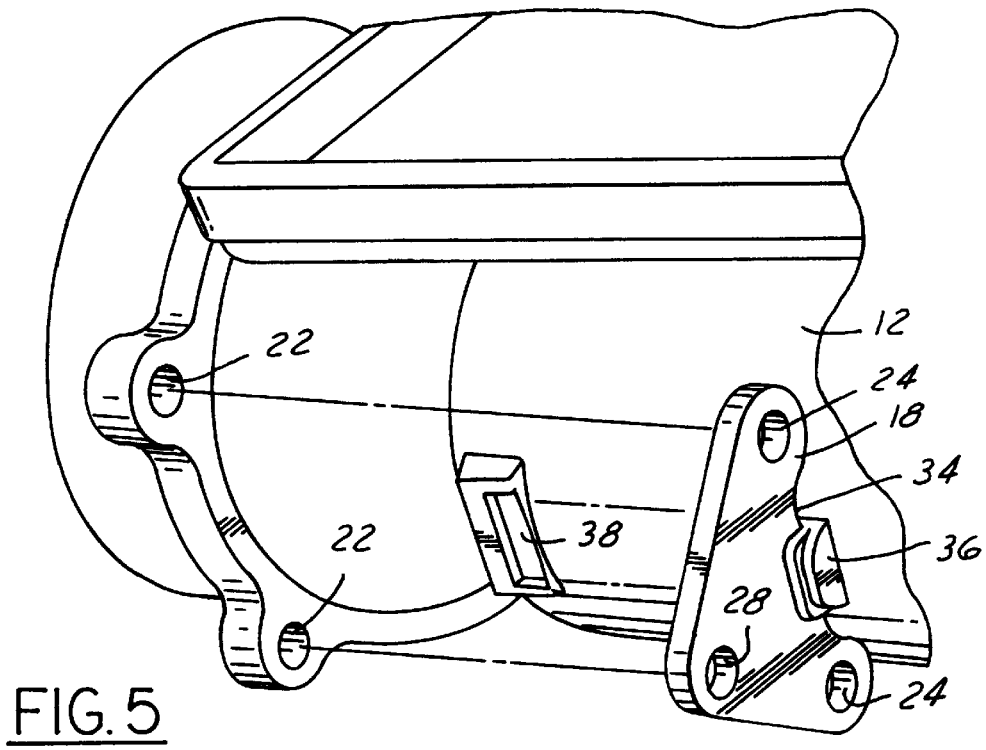
FIG. 5 is a side view of a pump reservoir having a notch formed therein for engagement with a locking tab of a mounting bracket in accordance with a preferred embodiment of the present invention and FIG. 6 is a side view of an electro-hydraulic power steering power pack attached to a vehicle structure by a mounting bracket in accordance with a preferred embodiment of the present invention.

Referring now to FIGS. 3 through 5, which illustrate an alternative preferred embodiment of the mounting bracket 18. In this embodiment, the mounting bracket 18 has a pair of inward bracket apertures 24 that lie in the same plane and are disposed on either side of the bracket inward surface 34. In this configuration, the outward bracket aperture 28 lies in generally the same plane as the inward bracket apertures 24. This allows the power pack 10 to be mounted to the vibration isolation system in a vertical configuration. Accordingly, the mounting brackets 18 are secured to the power pack 10 and allow flexibility for usage in multiple vehicles and vehicle packages. Through the use of this single combination mounting bracket 18, cost and weight are reduced due to the elimination of a second bracket/fastener system for the pump reservoir 12.

While particular embodiments of the invention have been shown and described, numerous variations and alternate embodiments will occur to those skilled in the art. Accordingly, it is intended that the invention be limited only in terms of the appended claims.

What is claimed is:

1. An electro-hydraulic power pack, including electric motor and a hydraulic pump, comprising:
   a motor housing in which the electric motor is disposed;
   a pump reservoir in which the hydraulic pump is disposed, said pump reservoir being secured to said motor housing;
   a plurality of mounting apertures formed in either said motor housing or said pump reservoir, said mounting apertures being uniformly spaced around said motor housing or said pump reservoir;
   a plurality of mounting brackets for attaching the power pack to a vehicle, each of said plurality of mounting brackets having a plurality of bracket openings, one of said bracket openings being alignable with the respective one of said plurality of mounting apertures to receive a fastener therethrough, another of said plurality of bracket openings being alignable with an opening formed in said vehicle to effectuate attachment of the power pack to said vehicle.

2. The power pack as recited in claim 1, wherein said plurality of mounting apertures are formed in said motor cover.

3. The power pack as recited in claim 2 further comprising a plurality of recesses formed in an outer surface of said pump reservoir.

4. The power pack as recited in claim 3 wherein each of said plurality of mounting brackets has a locking tab for engagement with a respective one of said plurality of recesses.

5. The power pack as recited in claim 4, wherein each of said mounting brackets is generally flat for mounting the power pack in a vertical orientation.

6. The power pack as recited in claim 4, wherein each of said mounting brackets has a flange portion extending generally perpendicular to said mounting bracket for mounting the power pack in a horizontal orientation.

7. A mounting bracket for securing electro-hydraulic power steering power pack to a vehicle, comprising:
   an inner surface for contacting the power pack;
   a pair of mounting openings formed adjacent said inner surface for alignment with a respective mounting aperture formed in the power pack;
   an outward mounting opening formed distal from said inner surface for alignment with a mounting aperture formed in the vehicle structure to which the power pack is to be attached; and
   a locking tab being formed adjacent said inner surface for engaging the power pack.

8. The mounting bracket as recited in claim 7, wherein said pair of mounting openings and said outward mounting opening are formed in the same plane.

9. The mounting bracket as recited in claim 8, wherein the mounting bracket is for attaching the power pack within the vehicle in a vertical orientation.

10. The mounting bracket as recited in claim 9, wherein said outward mounting opening lies in a different plane from a plane in which said pair of mounting openings are formed.

11. The mounting bracket as recited in claim 9, wherein said outward mounting opening lies in a plane that is generally perpendicular to a plane in which said pair of mounting openings are formed.

12. The mounting bracket as recited in claim 7, wherein said locking tab is formed integral with said inner surface and extends therefrom.

13. The mounting bracket as recited in claim 7 wherein said pair of mounting apertures engage said respective mounting apertures that are integrally formed with a motor housing and wherein each said locking tab engages a recess formed in a pump reservoir so as to secure said motor housing to said pump reservoir.

14. An electro-hydraulic power steering power pack for a vehicle including an electric motor disposed in a motor housing and a hydraulic pump disposed in a pump reservoir, the power pack comprising:

a plurality of mounting apertures integrally formed with the motor housing, said plurality of mounting apertures being spaced outwardly with respect to an outer surface of the motor housing;

at least one integral mounting bracket for attaching the motor housing to the pump reservoir to form the power pack and for mounting the power pack to a structure within the vehicle, said mounting bracket including a plurality of mounting openings for alignment with respective ones of said plurality of mounting apertures for receipt of a fastener therethrough;

said mounting bracket further including a vehicle attachment opening disposed from said plurality of mounting openings, said vehicle attachment opening being alignable with an opening formed in said vehicle structure for receipt of a fastener to attach the power pack thereto.

15. The power pack as recited in claim 14, wherein said at least one integral mounting bracket includes a locking tab for engaging a slot formed in the pump reservoir to hold the pump reservoir and the motor housing together when said fastener is secured through said plurality of mounting apertures and said plurality of mounting openings.

16. The power pack as recited in claim 14, wherein said vehicle attachment opening is disposed in a plane that is generally perpendicular to a plane in which said plurality of mounting openings are formed.

17. The power pack as recited in claim 16, further comprising a pair of mounting brackets that are uniformly spaced about the power pack.

18. The power pack as recited in claim 14, wherein said vehicle attachment opening is disposed in a plane that is generally parallel to a plane in which said plurality of mounting openings are formed.

19. The power pack as recited in claim 18, wherein said mounting bracket is generally triangular in shape.

\* \* \* \* \*